(12) United States Patent
Boscolo

(10) Patent No.: US 10,280,539 B2
(45) Date of Patent: May 7, 2019

(54) PROCESS AND APPARATUS FOR PRODUCING A FIBROUS-CONTAINING AND/OR PARTICLE-CONTAINING NONWOVEN

(71) Applicant: BOMA ENGINEERING S.P.A., Milan (IT)

(72) Inventor: Galliano Boscolo, Vigliano Blellese (IT)

(73) Assignee: BOMA ENGINEERING S.P.A., Milan (IT)

( * ) Notice: Subject to any disclaimer, the term of this patent is extended or adjusted under 35 U.S.C. 154(b) by 267 days.

(21) Appl. No.: 15/301,334

(22) PCT Filed: Apr. 3, 2015

(86) PCT No.: PCT/EP2015/097018
§ 371 (c)(1),
(2) Date: Sep. 30, 2016

(87) PCT Pub. No.: WO2015/155378
PCT Pub. Date: Oct. 15, 2015

(65) Prior Publication Data
US 2017/0114483 A1    Apr. 27, 2017

(30) Foreign Application Priority Data

Apr. 7, 2014 (EP) .................................... 14163778
Sep. 22, 2014 (EP) .................................... 14185696

(51) Int. Cl.
*D04H 1/56* (2006.01)
*D04H 1/407* (2012.01)
(Continued)

(52) U.S. Cl.
CPC ............... *D04H 1/56* (2013.01); *B29B 9/10* (2013.01); *B29C 35/16* (2013.01); *B29C 70/12* (2013.01);
(Continued)

(58) Field of Classification Search
None
See application file for complete search history.

(56) References Cited

U.S. PATENT DOCUMENTS 3,849,241 A    11/1974    Butin et al.
4,048,364 A    9/1977    Harding et al.
(Continued)

FOREIGN PATENT DOCUMENTS

EP    0926288 A1    6/1999
WO    9829590 A2    7/1998
(Continued)

OTHER PUBLICATIONS

International Search Report dated Sep. 6, 2015 for International Application No. PCT/EP2015/097018, filed Apr. 3, 2015.

*Primary Examiner* — Mary Lynn F Theisen
(74) *Attorney, Agent, or Firm* — Avery N. Goldstein; Blue Filament Law PLLC

(57) ABSTRACT

The apparatus (1) for making a fibrous-containing and/or particle-containing nonwoven (NW) comprises a spinning unit (10) with a spinning head (104), a forming surface (11*a*) that is movable in a conveying direction (MD), and a channel (13) positioned between the spinning head (104) and the movable forming surface (11*a*), and formed between at least two transverse walls (14*a*; 14*b*), that extend transverse to the conveying direction (MD) and that are in the vicinity of the movable forming surface (11*a*), or that are in frictional contact with the movable forming surface (11*a*). The spinning unit (10) is adapted for spinning a stream of (Continued)

polymeric filaments or fibers (F) passing through said channel (13) and deposited onto said forming surface (11a). The apparatus further comprises supplying means (15) adapted for blowing at least one stream of cooling gas (C) and fibrous material and/or particles inside said channel (13) in the vicinity of the spinning head (104) and towards the stream of hot polymeric filaments or fibers (F) inside said channel (13), said at least one stream of cooling gas (C) enabling simultaneously to cool the stream of hot fibers or filaments (F) produced by the spinning unit (10) and to transport and blow the fibrous material (M) and/or particles inside said channel (13) and into said stream of hot polymeric filaments or fibers (F).

42 Claims, 2 Drawing Sheets

(51) Int. Cl.
| | | |
|---|---|---|
| *B29B 9/10* | (2006.01) | |
| *B29C 35/16* | (2006.01) | |
| *B29C 70/12* | (2006.01) | |
| *B29C 70/30* | (2006.01) | |
| *B29C 70/34* | (2006.01) | |
| *B29K 105/00* | (2006.01) | |
| *B29L 9/00* | (2006.01) | |

(52) U.S. Cl.
CPC ............ *B29C 70/305* (2013.01); *B29C 70/34* (2013.01); *D04H 1/407* (2013.01); *B29C 2035/1658* (2013.01); *B29K 2105/251* (2013.01); *B29L 2009/00* (2013.01)

(56) References Cited

U.S. PATENT DOCUMENTS

| | | |
|---|---|---|
| 4,100,324 A | 7/1978 | Anderson et al. |
| 4,931,355 A | 6/1990 | Radwanski et al. |
| 4,939,016 A | 7/1990 | Radwanski et al. |
| 2007/0045905 A1 | 3/2007 | Venturino et al. |
| 2007/0045906 A1 | 3/2007 | Daniels et al. |
| 2008/0317895 A1 | 12/2008 | Boscolo et al. |
| 2011/0045261 A1* | 2/2011 | Sellars ............... B32B 5/26 428/213 |
| 2016/0136924 A1* | 5/2016 | Lee .................... D04H 1/74 428/113 |

FOREIGN PATENT DOCUMENTS

| | | |
|---|---|---|
| WO | 0039379 A2 | 6/2000 |
| WO | 2007032832 A2 | 3/2007 |
| WO | 2012020053 A1 | 2/2012 |

* cited by examiner

PROCESS AND APPARATUS FOR PRODUCING A FIBROUS-CONTAINING AND/OR PARTICLE-CONTAINING NONWOVEN

TECHNICAL FIELD

The present invention relates to the field of producing a fibrous-containing and/or particle-containing nonwoven, and in particular a fibrous-containing and/or particle-containing meltblown nonwoven.

PRIOR ART

A well-known technology for spinning fibres or filaments and making a nonwoven is the so-called meltblown technology. A process and apparatus for manufacturing a meltblown nonwoven are well-known and described for example in U.S. Pat. No. 3,849,241 to Butin et al and in U.S. Pat. No. 4,048,364 to Harding et al.

Another well-known technology for spinning continuous filaments and making a nonwoven is the so-called spunbonding technology.

Basically, the well-known process for manufacturing a meltblown nonwoven involves extruding at least one molten polymeric material through a meltblow spinning head (also called "die head") in order to form a stream of meltblown polymeric filaments, and attenuating these filaments by converging flows of a high velocity heated gas (usually air), hereafter called "primary air". This primary air is heated at a temperature which is typically equal or slightly greater than the melt temperature of the polymer. This hot primary air draws and attenuates the polymeric filaments immediately at the outlet of the spinning head. In a meltblown process, the drawing force for attenuating the meltblown filaments is thus applied immediately at the outlet of the spinning head while the polymer is still in the molten state. At the outlet of the spinning head, a large volume of cooling air, hereafter called "secondary air" is drawn into the primary air. This secondary air is cooling down the meltblown filaments downstream from the spinning head and provides the quenching of the meltblown filaments.

Generally, but not necessarily in a meltblow process, the primary air is also adjusted in such way that the meltblown filaments are broken at the outlet of the die head into fibres of shorter length. The fibres generally have a length exceeding the typical length of staple fibres.

The meltblown fibres or filaments are delivered downstream from the spinning head onto a moving surface, like for example a cylinder or conveyor belt, in order to form a meltblown nonwoven web of unoriented meltblown fibres or filaments. Preferably, the forming surface is air permeable, and even more preferably suction means are provided for sucking the fibres or filaments onto the forming surface. This meltblown nonwoven web can then be transported to consolidating means, like for example thermal bonding calender, a water needling unit, an ultrasonic bonding unit, in order to form a consolidated meltblown nonwoven web.

With a standard meltblow process, meltblown nonwovens made of very fine denier fibres can be advantageously produced. Typically, the average diameter of meltblown fibres can be less than 10 µm. As a result, meltblown nonwovens of low air permeability and good coverage can be advantageously obtained.

In a spunbonding process, at least one molten polymeric material is also extruded through a through a spinning head in order to form a stream of polymeric filaments and these filaments are also deposited onto a forming movable surface, like a conveyor belt. These filaments are most often rapidly cooled by cooling air streams that are blown downwardly the spinning head (quenching step), and the filaments are further stretched and attenuated by additional blown air streams in order to orient the molecular chains and increase the filament strength.

A meltblown or spunbonded nonwoven can be used alone for making a textile product or can be used in a laminate comprising additional layers, such as for example other nonwoven web(s) [meltblown web(s), spunbonded web(s), carded web(s), air-laid web(s)] and/or additional fibrous layer(s), such as for example fibrous layer(s) made of wood-pulp fibres, and/or additional plastic film(s). The laminate can be consolidated by any known consolidating means, including thermal bonding, mechanical bonding, hydroentangling, ultrasonic bonding, air-through bonding, and adhesive bonding.

More particularly, for making a laminate having high absorbency properties, it is known to laminate a meltblown nonwoven with at least one layer of fibrous material having high absorbency capacity, such as for example a layer of short wood-pulp fibres. This layer of wood-pulp fibres can also be mixed with particles, such as particles made of super absorbent material.

One important drawback of such a laminate is the low cohesion between the fibrous layer and the meltblown nonwoven prior to or even after the consolidation step of the laminate. This low cohesion leads to high and detrimental loss of fibrous material (e.g. wood-pulp fibres) or particles.

A process for producing a fibrous-containing or particle-containing meltblown nonwoven, also referred in the prior art as "coform" nonwoven" and more particularly a pulp-containing meltblown nonwoven, is disclosed for example in U.S. Pat. No. 4,931,355 and in U.S. Pat. No. 4,939,016 to Radwanski et al. A process for producing a particle-containing meltblown nonwoven is also disclosed in PCT application WO 00/39379. The fibrous material, e.g. wood pulp, or the particulate material is fed directly into the stream of meltblown filaments or fibres on one side of the stream of meltblown filaments or fibres, and immediately downstream from the outlet of the meltblow spinning head.

In such a process, due to the high velocity of the stream of meltblown filaments or fibres at the outlet of the spinning head, it is actually difficult to reliably incorporate the fibrous material or particulate material inside the meltblown filaments or fibres that are extruded through the spinning head. As a result, during the manufacturing process, a large quantity of fibrous material or particulate material is not incorporated inside the meltblown filaments or fibres, but is on the contrary pushed back by the air flow that surrounds the stream of meltblown filaments or fibres, and is detrimentally spread in the ambient air. Furthermore, in the fibrous-containing meltblown nonwoven or in the particle-containing meltblown nonwoven that is obtained with such a process, the fibrous or particulate material is not intimately incorporated and intermingled with the meltblown filaments or fibres. This poor intermingling and poor bonding lead to high loss of fibrous material or of particulate material when the fibrous-containing meltblown nonwoven or particle-containing meltblown nonwoven is subsequently transported or handled. The low incorporation of the fibrous material or particulate material inside the meltblown filaments or fibres also renders this kind of nonwoven very difficult to thermal bond in a subsequent consolidating step.

Another process for producing a fibrous-containing or particle-containing meltblown nonwoven is also described in patent application US 2007/0045905 to Venturino et al. In this process, two meltblown spinning heads are used to blow two streams of melblown fibres onto a conveyor belt. A stream of fibrous material, like pulp fibres, and/or of particles is blown towards the conveyor belt in between the two streams of melblown fibres.

In such a process, the fibrous-containing or particle-containing meltblown nonwoven is made of three layers: one layer of fibrous and/or particle material sandwiched between two layers of melblown fibres. With such a process, the fibrous and/or particulate material is not intimately incorporated and intermingled with the meltblown filaments or fibres. This poor intermingling and poor bonding lead to high loss of fibrous material or of particulate material when the fibrous-containing meltblown nonwoven or particle—containing meltblown nonwoven is subsequently transported or handled. The low incorporation of the fibrous material or particulate material inside the meltblown fibres also renders this kind of nonwoven very difficult to thermal bond in a subsequent consolidating step. The fibrous-containing or particle-containing meltblown nonwoven that is obtained has essentially a multilayer structure and can be easily delaminated. Another drawback of the "coform" technology described in aforesaid U.S. Pat. Nos. 4,931,355, 4,939,016, PCT application WO00/39379, and in US 2007/0045905 is related to the high distance that is needed between the spinning head and the movable forming surface, in order to obtain the required cooling of the meltblown filaments or fibres.

OBJECTIVE OF THE INVENTION

A main objective of the invention is to propose a novel improved technical solution for making a fibrous-containing and/or particle-containing nonwoven wherein the added material (fibrous material and/or particles) is intimately intermingled and bonded with the polymeric fibres or filaments of the nonwoven.

Another objective of the invention is to propose a novel improved technical solution for making a fibrous-containing and/or particle-containing nonwoven wherein the risk of added material (fibrous material and/or particles) loss of is being reduced.

SUMMARY OF THE INVENTION

This objective is achieved by the apparatus or by the process having the following characteristics.

Said apparatus for making a fibrous-containing and/or particle-containing nonwoven comprises a spinning unit with a spinning head, a forming surface that is movable in a conveying direction, and a channel positioned between the spinning head and the movable forming surface. Said channel is formed between at least two transverse walls, that extend transverse to the conveying direction and that are in the vicinity of the movable forming surface, or that are in frictional contact with the movable forming surface. The spinning unit is adapted for spinning a stream of polymeric filaments or fibres passing through said channel and deposited onto said forming surface. The apparatus further comprises supplying means adapted for blowing at least one stream of cooling gas and fibrous material and/or particles inside said channel in the vicinity of the spinning head and towards the stream of hot polymeric filaments or fibres inside said channel. Said at least one stream of cooling gas enables simultaneously to cool the stream of hot fibres or filaments produced by the spinning unit and to transport and blow the fibrous material and/or particles inside said channel and into said stream of hot polymeric filaments or fibres particles inside said channel.

Said process for making a fibrous-containing and/or particle-containing nonwoven comprises:
(i) extruding at least one melted polymeric material through a spinning head in order to form a stream of polymeric filaments or fibres,
(ii) passing the stream of polymeric filaments or fibres through a channel formed between at least two transverse walls,
(iii) depositing said stream of polymeric filaments or fibres onto said forming surface that is moving in a conveying direction, said transverse walls extending in a cross direction transverse to the conveying direction, and being in the vicinity of said movable forming surface, or being in frictional contact with said movable forming surface,
(iv) blowing at least one stream of cooling gas (C), in particular at least one stream of cooling air (C), and fibrous material and/or particles inside said channel in the vicinity of the spinning head and towards the stream of hot polymeric filaments or fibres inside said channel, said at least one stream of cooling gas enabling simultaneously to cool the stream of hot fibres or filaments produced by the spinning unit and to transport and blow the fibrous material and/or particles inside said channel and into said stream of hot polymeric filaments or fibres particles inside said channel.

In the apparatus and in the process of the invention, the fibrous-containing and/or particle—containing material is introduced inside the said channel and then comes into contact inside the said channel with the stream of polymeric filaments of fibres that are still hot.

The terms "fibrous material" used therein and in the claims encompass any material comprising short length fibres. The fibrous material can advantageously comprise absorbent pulp fibres. The average length of the fibres of the fibrous material will generally not exceed the average length of the polymeric fibres or filaments produced by the spinning unit.

The term "pulp" as used therein refers to absorbent material made of or containing fibres from natural sources such as for example woody and non-woody plants. Woody plants (i.e. wood-pulp) include, for example, deciduous and coniferous trees. Non-woody plants include, for example, cotton, flax, esparto grass, milkweed, straw, jute hemp, and bagasse. Typically, the average length of the pulp fibres is not more than 5 mm. Longer fibres can be however also used for the fibrous material.

Within the scope of the invention, the fibrous material can be made solely of pulp, or can also be made of a dry mixture of pulp with other materials (fibres and/or particles). In particular the fibrous material can comprise dry mixture of pulp and particles of superabsorbent material (SAM).

The fibrous material can also comprise staple fibres (natural and/or synthetic), and for example cotton fibres.

The fibrous material does not necessarily comprise pulp fibres.

By "particle", "particles", "particulate", "particulates" and the like, it is meant therein that the particulate material is generally in the form of discrete units. The particles can comprise granules, pulverulents, powders, spheres, or capsules. Thus, the particles may have any desired shape. Desired particle shapes include, for example, cubic, rod-like, polyhedral, spherical or semi-spherical, rounded or semi-rounded, angular, irregular, etc. Shapes having a large greatest dimension/smallest dimension ratio, like, needles, fibres and flakes, are also contemplated for use herein. The desired shaped particles may be coated (gel-coated, protein coated and the like having a particulate core, a porous solid core, a solid core, a semi-solid core, a liquid core, a semi-liquid core, a gaseous core, a semi-gaseous core or combinations thereof) or uncoated (porous solid, solid, semi-solid and the like). It should be noted that more than one kind of particles.

The use of "particle" and "particulate" may also describe an agglomeration comprising more than one particle, particulate or the like.

Within the scope of the invention, the particles may be capable of slightly penetrating into one or more solidifying fibre or filaments produced by the spinning unit.

Included among the variety of particles having utility in the present invention are superabsorbents. The superabsorbent material (also commonly referred as "SAM" or "SAP") suitable for incorporation in various embodiments of the present invention may be any superabsorbent that will maintain its particle integrity during the spinning process and exhibit good storage, handling, and resistance to gel-blocking properties. Typical of such superabsorbent materials are the water-insoluble hydrocolloidal particles derived from starches that will swell, but not dissolve when exposed to water. Also suitable for various embodiments of the invention are those superabsorbents formed from hydrolyzed cross-linked polyacrylamides, polyacrylates, polymers of acrylic polymers, or their copolymers. Such materials, when lightly cross-linked, are insoluble and, when dry, are solids that may be heated and blown in a gas stream, and maintain their integrity when impacting one or more solidifying spun fibres.

Also included within the scope and spirit of the present invention are particles suitable for use in controlling odour often emanating from absorbent articles used for absorption of body fluids such as menses, blood, urine, and other excrements. Suitable odour-controlling particles include activated charcoal or active carbon, baking soda, chitin, deodorizing materials such as clays, diatomaceous earth, zeolites, and complexes of potassium permanganate with active alumina, used alone or in combination.

Various embodiments of the present invention also contemplate including particles to control air-borne and vapour-borne odours, as well as including particulate material to slowly release a masking scent. The release of a masking scent can be achieved by using an absorbent material that slowly releases an incorporated scent, similar to the mechanism by which superabsorbers slowly release moisture. As an example, time release fragrances, using a fragrance adsorbed on a particulate silica surface, can be incorporated in the nonwoven web. Other deodorants and masking scents, also known in the art, which can be incorporated in particle form in the web, include the maladates, commonly known as chemical masking agents.

The amount of particles and/or fibrous material included in the nonwoven can depend on the particular use to be made of the nonwoven. In the present invention, particles and/or fibrous material may be added in any amount from a very minimum to an upper range. The particles and/or fibrous material may be about 0.1 to about 80 percent, by weight, of the layer containing the particles and/or fibrous material.

Whatever the shape in cross section of a fibre or filament F is, the diameter of said fibre or filament F can be for example measured by using an optical or electronic microscope. In that case, when the shape in cross section of the fibre or filament F is round, the diameter is the diameter of the round fibre or filament. If the shape in cross section of the fibre or filament F is not round (for example bilobal shape or the like), then one have to measure and calculate the area in cross section of the fibre or filament F and the diameter of the fibre or filament F is the diameter of an equivalent round fibre or filament having the same area in cross section.

More particularly, the apparatus can optionally have any one of the optional following characteristics, each optional characteristic being taken alone, or in combination with at least any one of the other optional characteristics:

- Said at least one stream of cooling gas is a stream of air.
- The supplying means are adapted for blowing the said at least one stream of cooling gas and fibrous material (M) and/or particles inside the channel transversally to the stream of hot polymeric filaments or fibres.
- The supplying means are adapted for blowing the said at least one stream of cooling gas and fibrous material and/or particles towards the stream of hot polymeric filaments or fibres on both opposite sides of the stream of filaments or fibres.
- The movable forming surface is air permeable and the apparatus further comprises a suction unit for sucking air from the inside of the channel and through the movable forming surface.
- The two transverse walls are flexible.
- The distance (H) between the spinning head and the movable forming surface is not more than 350 mm, and preferably between 100 mm and 350 mm.
- The distance (H) between the spinning head and the movable forming surface is adjustable.
- The spinning unit is a meltblow spinning unit.
- The spinning unit comprises blowing means for blowing a hot attenuating air (A) towards the outlet of the spinning head in order to draw and attenuate the filaments or fibres immediately at the outlet of the spinning head.
- The blowing means of the spinning unit are adapted to blow said hot attenuating air in such a way to break the filaments extruded through the spinning head into short fibres.
- The spinning unit is adapted for spinning a stream of hot polymeric fibres comprising ultra-fine fibres having a diameter less than 2 µm, and more preferably nanofibres having a diameter less than 1 µm, and even more preferably a diameter less than 0.5 µm.
- The spinning unit is adapted for spinning a stream of hot polymeric fibres comprising fibres having a length between 4 mm and 30 mm, more preferably between 4 mm and 20 mm, and even more preferably between 4 mm and 15 mm.
- The blowing means of the spinning unit are adapted to blow said hot attenuating air (A), in such a way to break the filaments extruded through the spinning head into short fibres having a length of not more than 30 mm.
- The blowing means of the spinning unit are adapted to blow said hot attenuating air (A), in such a way to break the filaments extruded through the spinning head into short fibres (F) having a diameter of not more than 50 µm, and more particularly between 0.1 µm and 50 µm.
- The blowing means of the spinning unit are adapted to blow said hot attenuating air (A), in such a way to draw the filaments extruded through the spinning head into continuous filaments, without breaking them.
- The filaments or fibres produced by the spinning unit are drawn only by the hot attenuating air (A) blown by said blowing means of the spinning unit.

Said supplying means comprise at least one blowing nozzle.

One of the transverse walls is attached to said blowing nozzle.

Said supplying means comprise two opposite blowing nozzles.

The transverse walls are respectively attached to said blowing nozzles.

A seal is provided between each blowing nozzle and the spinning head, in order to prevent ambient air from passing between each blowing nozzle and the spinning head.

Said supplying means are adapted to blow said at least one stream of cooling gas at a temperature between 10° C. and 30° C.

Said supplying means are adapted to blow said at least one stream of cooling gas in the channel with a speed of not less than 5 m/s, preferably between 5 m/s and 20 m/s, and even more preferably between 5 m/s and 10 m/s.

Said supplying means are adapted to blow said at least one stream of cooling gas having a relative humidity between 60% and 80%.

The channel is extending from the spinning head.

Said supplying means are adapted to supply a stream of fibrous material comprising at least pulp fibres.

The movable surface is a conveyor belt or a rotating cylinder.

Each transverse wall is or comprises a flexible lip, preferably in frictional contact with the movable surface.

More particularly, the process of the invention can optionally have any one of the optional following characteristics (c1) to (c24), each optional characteristic (c1) to (c24) being taken alone, or in combination with at least any one of the other optional characteristics:

(c1) The said at least one stream of cooling gas (C) and fibrous material (M) and/or particles is blown inside the channel transversally to the stream of hot polymeric filaments or fibres (F).

(c2) At least one stream of cooling gas (G) and of said fibrous material and/or particles is blown inside the channel (13) on each side of the stream of filaments or fibres.

(c3) The movable forming surface is air permeable and the process further comprising sucking air from the inside of the channel and through the movable forming surface.

(c4) The two transverse walls are flexible.

(c5) The distance (H) between the spinning head and the movable forming surface is not more than 350 mm, and is preferably between 100 mm and 350 mm.

(c6) The distance (H) between the spinning head and the movable forming surface is adjustable.

(c7) The filaments or fibres produced by the spinning head are meltblown filaments or fibres.

(c8) A hot attenuating air is blown towards the outlet of the spinning head in order to draw and attenuate the filaments or fibres immediately at the outlet of the spinning head.

(c9) Said hot attenuating air is used also to break the filaments extruded through the spinning head into short fibres.

(c10) The fibres produced by the spinning head comprises ultra-fine fibres having a diameter less than 2 µm, and more preferably nanofibres having a diameter less than 1 µm and even more preferably a diameter less than 0.5 µm.

(c11) The fibres produced by the spinning head comprises fibres having a length between 4 mm and 30 mm, more preferably between 4 mm and 20 mm, and even more preferably between 4 mm and 15 mm (c12) The fibres produced by the spinning head comprises fibres having a diameter of not more than 50 µm, and more particularly a diameter between 4 µm and 50 µm.

(c13) Said hot attenuating air is used to draw the filaments extruded through the spinning head into continuous filaments, without breaking them.

(c14) The filaments or fibres produced by the spinning unit are drawn only by said hot attenuating air.

(c15) Said at least one stream of cooling gas is at a temperature between 10° C. and 30° C.

(c16) Said at least one stream of cooling gas has a relative humidity between 60% and 80%.

(c17) the speed of said at least one stream of cooling gas is not less than 5 m/s, and preferably between 5 m/s and 20 m/s, and even more preferably between 5 m/s and 10 m/s.

(c18) The fibrous material comprises at least pulp fibres.

(c19) The process further comprises forming a laminate by depositing the said fibrous-containing and/or particle-containing nonwoven onto an additional bottom layer, and more particularly onto an additional bottom nonwoven layer, even more particularly onto a spunbonded layer.

(c20) The process further comprises forming a laminate by depositing a top layer, and more particularly a top nonwoven layer, and even more particularly a spunbonded layer, onto the fibrous-containing and/or particle-containing nonwoven.

(c21) The process further comprises consolidating the fibrous-containing and/or particle-containing nonwoven or the laminate comprising the fibrous-containing and/or particle-containing nonwoven.

(c22) The consolidating step of the fibrous-containing and/or particle-containing nonwoven or of the laminate is performed at least by thermal bonding.

(c23) the nonwoven or laminate is compressed by the downstream transverse wall against the forming surface.

(c24) the downstream transverse wall is compressing the nonwoven or laminate against the forming surface, and makes a seal that avoids any disturbing air from the ambient air to enter, and in particular to be sucked, into the channel, between the downstream transverse wall and the forming surface.

Another object of the invention is a production line comprising at least the aforesaid apparatus, and more particularly a production line for making a laminate comprising at least one fibrous-containing and/or particle-containing nonwoven layer.

More particularly, the production line can optionally have any one of the optional following characteristics (c25) to (c27), each optional characteristic (c25) to (c27) being taken alone, or in combination with at least any one of the other optional characteristics:

(c25) The production line comprises an additional production unit, and more particularly a spunbonding unit, adapted for producing a bottom nonwoven layer, and more particularly a spunbonded nonwoven, onto which the fibrous-containing and/or particle-containing nonwoven produced by the apparatus is deposited.

(c26) The production line comprises an additional production unit, and more particularly a spunbonding unit, adapted for producing a top nonwoven layer, and more particularly a spunbonded nonwoven, that is deposited onto the fibrous-containing and/or particle-containing nonwoven produced by the apparatus.

(c27) The production line comprises consolidating means, and more particularly a thermal bonding unit, for consolidating the fibrous-containing and/or particle-containing nonwoven produced by the apparatus or for consolidating the laminate comprising the fibrous-containing and/or particle-contain ing nonwoven produced by the apparatus.

Another object of the invention is the use of the aforesaid apparatus for producing a fibrous-containing and/or particle-containing nonwoven.

Another object of the invention is the use of the aforesaid production line for producing laminate comprising a fibrous-containing and/or particle-containing nonwoven layer.

Another object of the invention is a composite nonwoven (NW) issued for the aforesaid process and comprising polymeric fibres (F) and fibrous material and/or particles intermingled with the polymeric fibres. The terms "composite nonwoven" used therein and in the claims has to be understood and interpreted as designing a nonwoven wherein the added material in the form of fibrous material and/or particles has been introduced directly into the stream of spun polymeric fibres extruded through a spinneret and prior to the deposition of the spun polymeric fibres onto a movable forming surface, like a transport belt, a forming cylinder, or the like, the polymeric fibres mixed with the added material being co-deposited onto a movable forming surface, like a transport belt, a forming cylinder, or the like. For sake of clarity, the wording "composite nonwoven" does not encompass laminated nonwovens wherein the added material in the form of fibrous material and/or particles is being deposited onto a nonwoven layer previously formed and transported onto a transport belt, a forming cylinder, or the like.

More particularly, the composite nonwoven can optionally have any one of the optional following characteristics, each optional characteristic being taken alone, or in combination with at least any one of the other optional characteristics:

- The polymeric fibres (F) comprise ultra-fine fibres having a diameter less than 2 µm, and more preferably nanofibres having a diameter less than 1 µm, and even more preferably a diameter less than 0.5 µm.
- Whole or part of said ultra-fine fibres has a length between 4 mm and 25 mm, more preferably between 4 mm and 20 mm, and even more preferably between 4 mm and 15 mm.
- The ultra-fine fibres are meltblown fibres.
- The ultra-fine fibres comprise fibres having a diameter less than 0.5 µm.

Another object of the invention is a laminate comprising a layer constituted by the aforesaid composite nonwoven and laminated with at least one additional layer, and more preferably with a nonwoven layer (L1 or L2).

More particularly, laminate can optionally have any one of the optional following characteristics, each optional characteristic being taken alone, or in combination with at least any one of the other optional characteristics:

- Said at least one additional layer is a spunbonded layer (L1 or L2).
- The composite nonwoven layer is sandwiched between two additional layers, and more preferably between two nonwoven layers (L1, L2).
- Each of the two additional nonwoven layers (L1, L2) is a spunbonded layer.
- The layers are thermal bonded.

Another object of the invention is an absorbent product comprising at least a fibrous-containing and/or particle-containing nonwoven produced with the aforesaid apparatus, or a laminate produced with the aforesaid production line, or a fibrous-containing and/or particle-containing nonwoven or laminate issued from the aforesaid process.

More particularly, the absorbent product can be selected from the group: dry wipe, wet wipe, diaper, training pant, sanitary napkin, incontinence product, bed pad, and absorbent sheet for use in a washing machine.

Another object of the invention is the use of at least a fibrous-containing and/or particle-containing nonwoven produced with the aforesaid apparatus, or of a laminate produced with the aforesaid production line, or of a fibrous-containing and/or particle-containing nonwoven or laminate issued from the aforesaid process, for making an absorbent products, and more particularly dry or wet wipes, diapers, training pants, sanitary napkins, incontinence products, bed pads, absorbent sheets for use in a washing machine.

BRIEF DESCRIPTION OF THE DRAWINGS

Other characteristics and advantages of the invention will appear more clearly on reading the following description of preferred embodiments of the invention, which description is given by way of non-limiting example and is made with reference to the accompanying drawings, in which.

DETAILED DESCRIPTION

Figure 1:
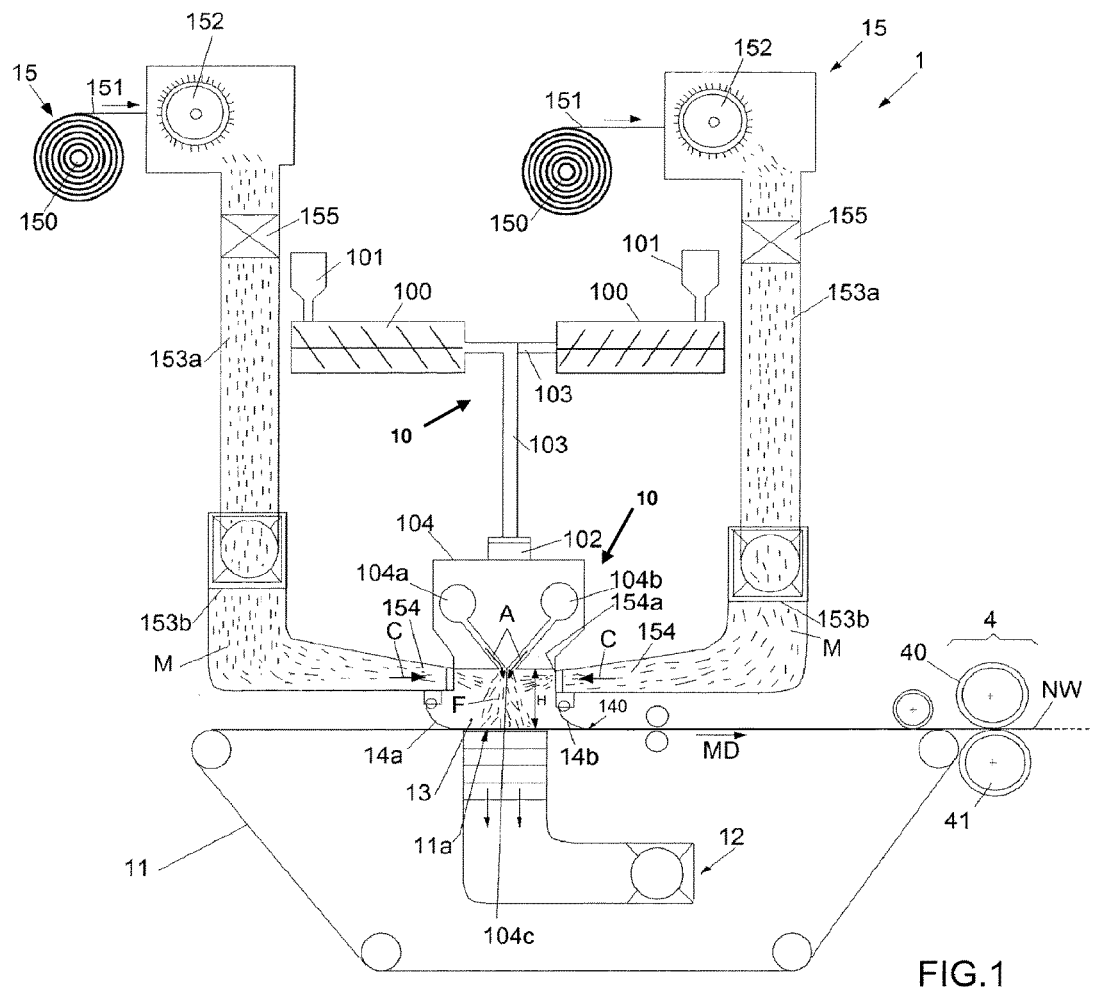
FIG. 1 is a schematic representation of an apparatus for producing a fibrous-containing containing meltblown nonwoven.

In reference to FIG. 1, the apparatus 1 for producing a fibrous-containing meltblown nonwoven layer comprises a meltblow spinning unit 10 for spinning polymeric meltblown fibres or filaments F, and a conveyor belt 11 onto which the meltblown fibres or filaments F are deposited.

This conveyor belt 11 is preferably air permeable and is associated with a suction device 12 for sucking the meltblown fibres of filaments F onto a forming surface 11a of the conveyor belt 11 that is moved in a conveying direction MD, also referred herein as machine direction.

As already known in the art, the meltblow spinning unit 10 comprises:

- two extruders 100
- two hoppers 101 containing polymeric pellets, each hopper 101 being connected to one extruder 100 and being adapted to supply the extruder 100 with polymeric pellets,
- a spinning pump 102 connected to the outlet of each extruder 100 via a duct 103,
- a meltblow spinning head 104 that knowingly comprises one or several parallel rows of spinning orifices 104c that extend in the cross direction (direction perpendicular to FIG. 1) and air blowing means 104a, 104b for knowingly blowing hot attenuating air flows A towards the filaments or fibres F in the vicinity of the spinning head 104.

These components 100 to 104 of the meltblow spinning unit 10 are already well known in the art and will not be described in details.

In operation of the meltblow spinning unit 10, the polymeric pellets are melted by the extruders 100 into a molten polymeric material, which is fed by the extruder 100 to the spinning pump 102. Said spinning pump 102 feeds the spinning head 104 in order to extrude the molten polymeric material(s) through the spinning orifices of the spinning head 104, and to form a stream of polymeric meltblown filaments F at the outlet of the spinning head 104.

The hot attenuating air flows A blown by the air blowing means 104a, 104b are drawing and attenuating the meltblown filaments F immediately at the outlet of the spinning head 104, while the polymer is still in the molten state. These hot primary air flows A are is typically heated at a temperature that is substantially equal or slightly higher than the melt temperature of the polymer.

The velocity of these primary air flows A is advantageously selected in such a way to break the fibres at the outlet of the spinning head 104, and to form shorter meltblown fibres F having a predetermined average length and diameter. Preferably, but not necessarily, the spinning unit 10 is adapted for example to produce meltblown fibres F having a length of not more than 30 mm, and more particularly between 4 mm and 30 mm, and a diameter between 0.1 µm and 50 µm.

In another variant of the invention, the velocity of the hot attenuating air flows A can also be advantageously selected in such a way to draw and attenuate the filaments F at the outlet of the spinning head 104, but without breaking them, in order to from continuous meltblow filaments.

Within the scope of the invention, the filaments or fibres F can have a circular shape in cross section or can have any kind of non-circular shape in cross section, including notably oval shape, ribbon shape, multilobal shape, more especially bilobal shape or trilobal shape. The shape in cross section is knowingly determined by the geometry of the spinning orifices of the spinning head 104. Within the scope of the invention, the spinning head 104 can have spinning orifices of different geometries and dimensions.

In FIG. 1, only one extruder 100 can be used. In that case, the filaments or fibres F are monocomponent fibres or filaments F. When the two extruders 100 are used, multicomponent fibres or filaments F, and more particularly bicomponent fibres or filaments F can be produced.

The polymer(s) P used for making the fibres or filaments F can be any melt spinnable polymer(s) than can be extruded through the spinning orifices of a spinning head. Good candidates are for example polyolefin (in particular homo or copolymer of polypropylene or polyethylene), homo or copolymer of polyester, or homo or copolymer of polyamide or any blend thereof. It can be also advantageously any biodegradable thermoplastic polymer, like for example homo or copolymer of polylactic acid (PLA), or any biodegradable blend comprising a homo or copolymer of PLA.

The fibres or filaments F will be generally not elastic. But elastomeric or elastic fibres or filaments F can be however also be produced.

In reference to FIG. 1, the apparatus 1 also comprises fibrous material supplying means 15 adapted for blowing cooling quenching air C and fibrous material M towards the stream of hot polymeric filaments or fibres F in the vicinity of the spinning head 104.

More particularly, in this embodiment the fibrous material supplying means 15 are adapted for blowing cooling quenching air C and a stream of fibrous material M towards the stream of hot polymeric filaments or fibres F, on two opposite sides of said stream of hot polymeric filaments or fibres F.

For producing each cooling quenching air C and stream of fibrous material M on one side of the stream of filaments or fibres F, the fibrous material supplying means 15 comprise a feeding roll 150 for feeding a web 151 of fibrous material to a hammer mill 152. In operation said mill 152 shreds the web 151 into short fibres, and for example into short pulp fibres.

The fibrous material M is sucked into at least one a vertical feeding duct 153a by suction means including one or several fans 155.

This feeding duct 153a communicates at one end with a feeding chimney 153b that extends in cross direction (i.e. width of the chimney) on the whole length of the spinning head 104. The fibrous material M is pneumatically fed by the fan(s) 155 inside the chimney 153b, in such a way to be homogenously distributed over the whole width of the feeding chimney 153b.

The feeding chimney 153b communicates with a blowing nozzle 154 having a blowing outlet 154a, that is in the vicinity of the stream of filaments or fibres F produced by the spinning head 104, and also that is positioned in vicinity of the outlet of the spinning orifices of the spinning head 104.

This blowing outlet 154a preferably extends in cross direction substantially on the whole length of the spinning head 104.

In use, the fans(s) 155 are blowing a stream of cooling gas C, and in particular a stream of cooling air, towards the blowing outlet 154a of the blowing nozzle 154.

The apparatus 1 also comprises two transverse walls 14a, 14b that are positioned between the blowing nozzles 154 and the movable forming surface 11a. These two transverse walls 14a, 14b extend transversally in the cross direction on the whole length of the spinning head 104, i.e. transverse to the conveying direction MD.

Preferably, these two transverse walls 14a, 14b are or comprise flexible lips.

In this particular embodiment of FIG. 1, these two transverse walls 14, 14b are attached respectively to the blowing nozzles 154.

More particularly, each transverse wall 14a, 14b has one edge 140 that is in frictional contact with the movable forming surface 11a.

More particularly, each blowing nozzle 154 is in contact with the spinning head 154 to form an air-tight seal.

These two transverse walls 14a, 14b and the blowing nozzles 154 delimit a closed internal channel 13 that extends between the spinning head 104 and the movable forming surface 11a. The transverse walls 14a, 14b prevent turbulent ambient air from entering inside the channel 13.

In another variant, one or both transverse wall 14a, 14b can have an edge in the vicinity of the movable forming surface 11a, but without being necessarily in frictional contact with the movable surface 11a.

The two lateral sides of this channel 13 that extends in the conveying direction MD are also preferably also be closed by lateral walls (not shown on the drawing), for example in Plexiglas®. The lower edges of these lateral walls do not touch the forming surface 11a, but at preferably in the vicinity of the forming surface 11a.

In operation, the suction means 12 are operated and are continuously sucking air inside the channel 13. A stream of hot polymeric filaments or fibres F is extruded in said channel 13 through the spinning orifices of the spinning head 104. Said stream of hot polymeric filaments or fibres F passes through said channel 13, and is randomly deposited onto the movable surface 11a.

Simultaneously, fibrous material M is transported and is blown by the stream of cooling gas C, and in particular by the stream of cooling air C, inside said channel 13, and then into said stream of hot filaments or fibres F.

When the fibrous material M comes into contact with the filaments or fibres F inside said channel 13, these filaments or fibres F are still hot, and the fibrous material M is intimately incorporated within the stream of the filaments or fibres F, and the bonding of the fibrous material M with the filaments or fibres F is improved.

The stream of cooling gas C is also cooling the filaments or fibres F inside the channel 13, thereby rapidly solidifying said filaments or fibres F. The temperature of this stream of cooling gas C is for example typically between 10° C. and 30° C. The relative humidity of said cooling air is for example between 60% and 80%.

The stream of cooling gas C is used both for transporting and blowing the stream of fibrous material M, and as quenching air for cooling down the stream of filament or fibres F. In order to transport the stream of heavy fibrous material M inside the blowing nozzle 154 and to efficiently blow the stream of heavy fibrous material M, the speed of the stream of gas C at the outlet 154a of each nozzle 154 needs preferably to be high compared with standard speed of quenching air (i.e. typically 0.5 m/s), and is preferably between 5 m/s and 20 m/s, and more preferably between 5 m/s and 10 m/s.

An absorbent nonwoven NW made of filaments or fibres F strongly and homogenous intermingled and bonded with fibrous material M is thus formed onto the movable forming surface 11a, and is then continuously transported outside the channel 13.

This nonwoven NW passes below the downstream transverse wall 14b. When this downstream transverse wall 14b is previously in frictional contact with the belt 11, the said downstream wall can be slightly deformed and/or lifted by the nonwoven NW, in order to allow the nonwoven to pass below the downstream transverse wall 14b.

The downstream transverse wall 14b is advantageously compressing the nonwoven NW against the movable forming surface 11a, and makes a seal that avoids any disturbing air from the ambient air to be sucked into the channel 13, between the downstream transverse wall 14b and the forming surface 11a.

The upstream transverse wall 14a is advantageously in contact with the conveyor belt, and also makes a seal that avoids any disturbing air from the ambient air to be sucked into the channel 13, between the upstream transverse wall 14b and the forming surface 11a.

In another variant, the transverse wall 14a and/or the transverse wall 14b can be replaced by a cylindrical wall, and more particularly by a rotating roller.

In the apparatus 1 of FIG. 1, thanks to the use of a stream of cooling gas C, and in particular of a stream of cooling air C, both for blowing the stream of fibrous material M and for cooling down the filament or fibres F inside the channel 13, the spinning head 104 can be advantageously positioned at a short distance H from the movable forming surface 11a. In practise, this distance H can be less than 350 mm, and will be preferably between 100 mm and 350 mm.

Preferably, this distance H will be adjustable.

In the particular embodiment of FIG. 1, fibrous material M is blown by the blowing nozzles 154 into the stream of hot spun filaments or fibres F. In another variant, the apparatus 1 can be modified in such a way that particles or particulate material is also blown by the blowing nozzles 154 into the stream of hot spun filaments or fibres F. These particles or particulate material can be mixed with the fibrous material before being blown into the stream of hot spun filaments or fibres F or can be blown alone or separately from the fibrous material M. In one variant, it is possible to blow only particles or particulate material into the stream of hot spun filaments or fibres F.

The nonwoven NW is transported by the conveyor belt and transferred to a thermal calendar 4, where the nonwoven NW is knowingly consolidated by thermal bonding, by passing between two calendering rolls 40, 41. One or both rolls 40, 41 are heated. Roll 41 is for example a smooth roll and the other roll 40 is hard roll having a bonding pattern of bonding dots as described in U.S. Pat. No. 3,855,046. One of the roll can also have an embossing pattern to knowingly emboss a design on the nonwoven. The nonwoven NW can also pass between embossing cylinders (not shown) to knowingly emboss a design on the nonwoven.

Advantageously, this nonwoven NW can be efficiently consolidated by thermal bonding, because the added material M (fibrous material and/or particles) is intimately intermingled with the filaments or fibres F, and does not form a non-thermoplastic barrier layer that would prevent the formation of thermal bonding dots or the like in the thermoplastic filaments or fibres F.

In another variant, the nonwoven NW can be however consolidated by using any other known consolidating means, including notably ultrasonic bonding, thermal bonding, adhesive bonding, air-through bonding, and hydroentanglement.

Figure 2:
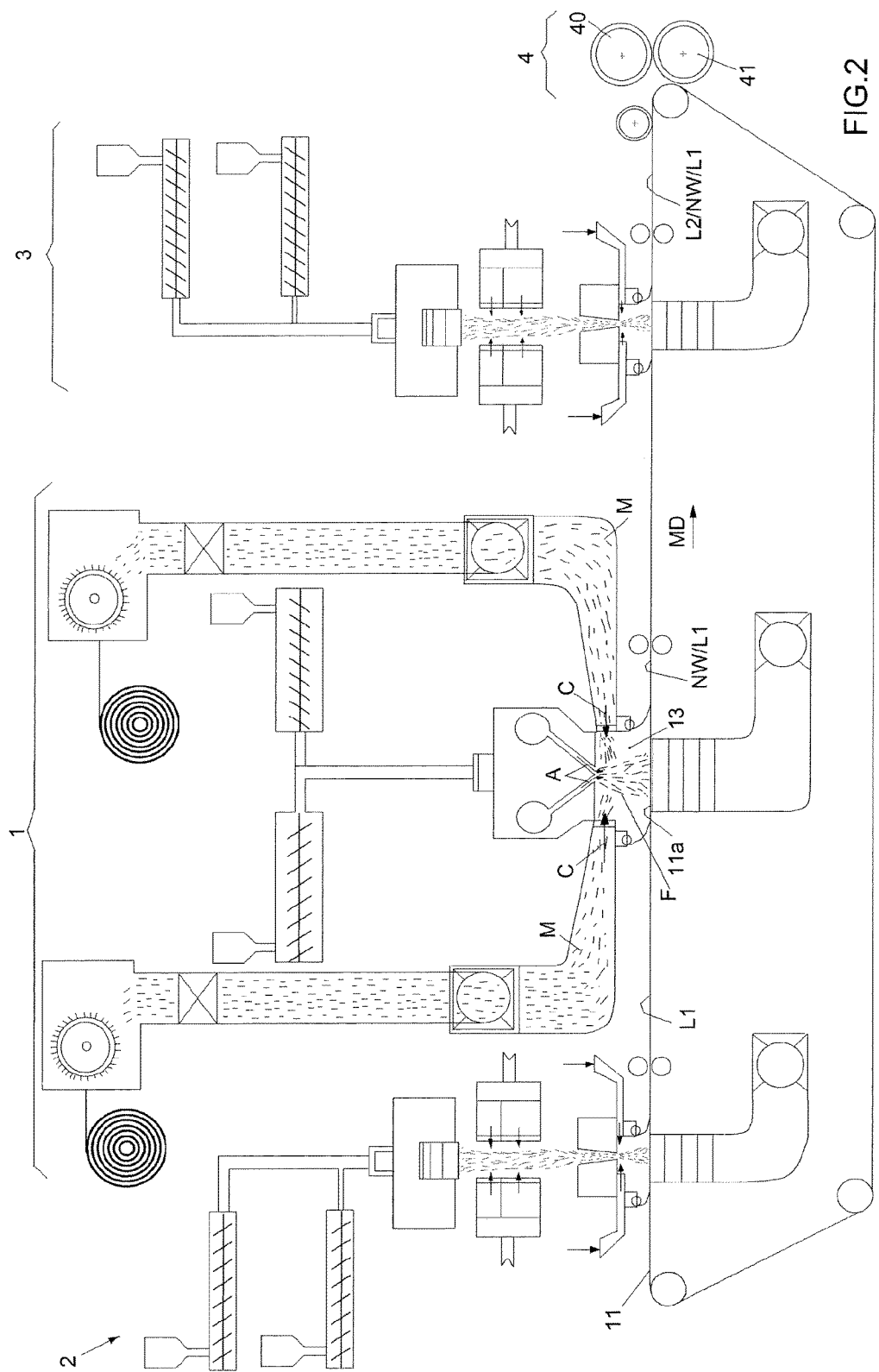
FIG. 2 is a schematic representation of a production line comprising the apparatus of FIG. 1 and adapted to produce a laminate comprising a fibrous-containing meltblown nonwoven layer.

In the particular embodiment of FIG. 2, the production line comprises an apparatus 1 similar to the apparatus of FIG. 1, and also two additional production units 2 and 3, for producing and depositing on the conveyor belt 11 two additional nonwoven layers L1 and L2 respectively upstream and downstream the nonwoven NW produced by the apparatus 1, in order to produce in line a laminate L2/NW/L1, wherein the nonwoven NW is sandwiched between the nonwoven layers L1 and L2, and wherein the nonwoven layer L2 is the top layer of the laminate and the nonwoven layer L1 is the bottom layer of the laminate.

More particularly, the upstream production unit 2 is a spunbonding unit that is used for extruding and depositing onto the conveyor belt 11 a bottom spunbonded layer L1, that is transported by the conveyor belt 11 below the channel 13 of apparatus 1. In operation, the fibrous-containing nonwoven NW is deposited onto said bottom layer L1. The upstream production unit 3 is also spunbonding unit that is used for extruding and depositing onto the fibrous-containing nonwoven NW a top spunbonded layer L2.

In the particular example of FIG. 1, the spunbonding units 2 and 3 are adapted to produce spunbonded layers L1 and L2 made of bicomponent fibres or filaments. Layers L1 and L2 made of monocomponent fibres or filaments can be also practised.

This laminate L2/NW/L1 is transported by the conveyor belt and transferred to a thermal calender 4, where the laminate is knowingly consolidated by thermal bonding, by passing between two calendering rolls 40, 41. One or both rolls 40, 41 are heated. Roll 41 is for example a smooth roll and the other roll 40 is hard roll having a bonding pattern of bonding dots as described in U.S. Pat. No. 3,855,046. One of the roll can also have an embossing pattern to knowingly emboss a design on the laminate. The laminate can also pass between embossing cylinders (not shown) to knowingly emboss a design on the laminate.

In another variant, the laminate can be consolidated by using any other known consolidating means, including notably ultrasonic bonding, thermal bonding, adhesive bonding, air-through bonding, and hydroentanglement.

In another variant, the nonwoven NW can be laminated with only one layer or with more than two other layers. An additional layer of the laminate can be any kind of textile layer, in particular any kind of nonwoven layer, or can be also a plastic film.

In another variant of the invention, the conveyor belt 11 can be also replaced by a rotating cylinder.

Preferred Composite Nonwoven and Laminate of the Invention

One skilled in the art will knowingly set up the spinning head 104 of the apparatus 1 of FIG. 1 or of FIG. 2, in particular the diameter of the spinning holes and the temperature and speed of the primary air flows A, in order to produce a preferred composite nonwoven layer NW of the invention comprising or comprising essentially ultrafine fibres F having a diameter less than 2 μm, and more preferably nanofibres F having a diameter less than 1 μm, and even more preferably a diameter less than 0.5 μm, and a length between 4 mm and 30 mm, more preferably between 4 mm and 20 mm, and even more preferably between 4 mm and 15 mm.

The use in a composite nonwoven of polymeric fibres comprising ultra-fine fibres having a diameter less than 2 μm, and more preferably nanofibres having a diameter less than 1 μm, and a length between 4 mm and 30 mm, more preferably between 4 mm and 20 mm, and even more preferably between 4 mm and 15 mm, surprisingly improves the intermingling and bonding of the added material (fibrous material and/or particles) with the fibres and surprisingly reduces the risk of loss of said added material when the composite nonwoven or when a laminate incorporating this composite nonwoven as a layer is manipulated or washed.

In particular, microscopic photographies of a aforesaid composite nonwoven of the invention have shown that the polymeric fibres were constituting a matrix wherein the added material (fibrous material and/or particle) was very well incorporated, and some ultra-fine fibres (diameter less than 2 μm, and more preferably nanofibres having a diameter less than 1 μm) preferably of length between 4 mm and 30 mm were rolled up around some added material, thereby improving the bonding of the added material with the fibres. In contrast, the same intermingling and bonding cannot be obtain with too thick fibres (more than 2 μm) and/or with too short fibres (less than 4 mm) or with long fibres, and more especially with continuous filaments.

More particularly, in the coform nonwoven of the invention the ultra-fine fibres can be meltblown fibres and/or the ultra-fine fibres can advantageously comprise nanofibres having a diameter less than 0.5 μm.

The production line of FIG. 2 can be advantageously used for producing in line a thermal bonded laminate L2/NW/L1 of the invention comprising at least three layers L2, NW, L1, and wherein the composite nonwoven layer NW is sandwiched between the two layers L1, and L2.

When a laminate comprising a layer made of a composite nonwoven NW of the invention is thermal bonded, and in particular thermal point bonded, the bonding of the laminate is improved because the fibrous material and/or particles, which are generally not thermofusible at the bonding temperature, are well incorporated within the matrix of polymeric fibres of the coform nonwoven (NW) and do not significantly interfere with the thermal bonding rolls.

The invention claimed is:

1. An apparatus (1) for making a fibrous-containing and/or particle-containing nonwoven (NW), said apparatus comprising a spinning unit (10) with a spinning head (104), a forming surface (11*a*) that is movable in a conveying direction (MD), and a channel (13) positioned between the spinning head (104) and the movable forming surface (11*a*), and formed between at least two transverse walls (14*a*; 14*b*), that extend transverse to the conveying direction (MD) and that are in the vicinity of the movable forming surface (11*a*), or that are in frictional contact with the movable forming surface (11*a*), the spinning unit (10) being adapted for spinning a stream of polymeric filaments or fibres (F) passing through said channel (13) and deposited onto said forming surface (11*a*), the apparatus further comprising supplying means (15) adapted for blowing at least one stream of cooling gas (C) and fibrous material and/or particles inside said channel (13) in the vicinity of the spinning head (104) and towards the stream of hot polymeric filaments or fibres (F) inside said channel (13), said at least one stream of cooling gas (C) enabling simultaneously to cool the stream of hot fibres or filaments (F) produced by the spinning unit (10) and to transport and blow the fibrous material (M) and/or particles inside said channel (13) and into said stream of hot polymeric filaments or fibres (F) inside said channel (13).

2. The apparatus of claim 1, wherein the supplying means (15) are adapted for blowing the said at least one stream of cooling gas (C) and fibrous material (M) and/or particles inside the channel (13) transversally to the stream of hot polymeric filaments or fibres (F).

3. The apparatus of claim 1, wherein the supplying means (15) are adapted for blowing the said at least one stream of cooling gas (C) and fibrous material (M) and/or particles towards the stream of hot polymeric filaments or fibres (F) on both opposite sides of the stream of filaments or fibres (F).

4. The apparatus of claim 1, wherein the movable forming surface (11*a*) is air permeable and the apparatus further comprises a suction unit (12) for sucking air from the inside of the channel (13) and through the movable forming surface (11*a*).

5. The apparatus of claim 1, wherein the two transverse walls (14*a*; 14*b*) are flexible.

6. The apparatus of claim 1, wherein the distance (H) between the spinning head (104) and the movable forming surface (11*a*) is not more than 350 mm.

7. The apparatus of claim 1, wherein the distance (H) between the spinning head (104) and the movable forming surface (11*a*) is adjustable.

8. The apparatus of claim 1, wherein the spinning unit (10) is a meltblow spinning unit.

9. The apparatus of claim 1, wherein the spinning unit (10) comprises blowing means (104*a*, 104*b*) for blowing a hot attenuating air (A) towards the outlet of the spinning head (104), in order to draw and attenuate the filaments or fibres (F) immediately at the outlet of the spinning head (104), and in such a way to break the filaments extruded through the spinning head (104) into short fibres (F).

10. The apparatus of claim 1, wherein the spinning unit (10) comprises blowing means (104*a*, 104*b*) for blowing a hot attenuating air (A) towards the outlet of the spinning head (104), in order to draw and attenuate the filaments or fibres (F) immediately at the outlet of the spinning head (104), and in such a way to draw the filaments extruded through the spinning head (104) into continuous filaments (F), without breaking them.

11. The apparatus of claim 1, wherein said supplying means (15) comprises at least one blowing nozzle (154).

12. The apparatus of claim 11 wherein each transverse wall (14*a*, 14*b*) is attached to one blowing nozzle (154).

13. The apparatus of claim 11, wherein a seal is provided between each blowing nozzle (154) and the spinning head (104), in order to prevent ambient air from passing between each blowing nozzle (154) and the spinning head (104).

14. The apparatus of claim 1, wherein the channel is extending from the spinning head.

15. The apparatus of claim 1, wherein said supplying means are adapted to supply a stream of fibrous material comprising at least pulp fibres.

16. The apparatus of claim 1, wherein each transverse wall is or comprises a flexible lip.

17. A production line comprising at least the apparatus (1) defined in claim 1.

18. The production line of claim 17, comprising an additional production unit (2), adapted for producing a bottom nonwoven layer (L1), onto which the fibrous-containing and/or particle-containing nonwoven (NW) produced by the apparatus (1) is deposited.

19. The production line of claim 17, comprising an additional production unit (3), adapted for producing a top nonwoven layer (L2), that is deposited onto the fibrous-containing and/or particle-containing nonwoven (NW) produced by the apparatus (1).

20. The production line of claim 17, comprising consolidating means (4), for consolidating the fibrous-containing and/or particle-containing nonwoven (NW) produced by the apparatus (1) or for consolidating the laminate comprising the fibrous-containing and/or particle-containing nonwoven (NW) produced by the apparatus (1).

21. A process for making a fibrous-containing and/or particle-containing nonwoven, comprising:
   (i) extruding at least one melted polymeric material through a spinning head (104) in order to form a stream of polymeric filaments or fibres (F),
   (ii) passing the stream of polymeric filaments or fibres (F) through a channel (13) formed between at least two transverse walls (14a; 14b),
   (iii) depositing said stream of polymeric filaments or fibres (F) onto said forming surface (11a) that is moving in a conveying direction (MD), said transverse walls (14a; 14b) extending in a cross direction transverse to the conveying direction (MD), and being in the vicinity of said movable forming surface (11a), or being in frictional contact with said movable forming surface (11a),
   (iv) blowing at least one stream of cooling gas (C) and fibrous material and/or particles inside said channel (13) in the vicinity of the spinning head (104) and towards the stream of hot polymeric filaments or fibres (F) inside said channel (13), said at least one stream of cooling gas (C) enabling simultaneously to cool the stream of hot fibres or filaments (F) produced by the spinning unit (10) and to transport and blow the fibrous material and/or particles inside said channel (13) and into said stream of hot polymeric filaments or fibres (F) inside said channel (13).

22. The process of claim 21, wherein the said at least one stream of cooling gas (C) and fibrous material (M) and/or particles is blown inside the channel (13) transversally to the stream of hot polymeric filaments or fibres (F).

23. The process of claim 21, wherein at least one stream of cooling gas (C) and of said fibrous material and/or particles is blown inside the channel (13) on each side of the stream of filaments or fibres.

24. The process of claim 21, wherein the movable forming surface is air permeable and the process further comprises sucking air from the inside of the channel and through the movable forming surface.

25. The process of claim 21, wherein the distance (H) between the spinning head and the movable forming surface is not more than 350 mm.

26. The process of claim 21, wherein the filaments or fibres produced by the spinning head are meltblown filaments or fibres.

27. The process of claim 21, wherein a hot attenuating air is blown towards the outlet of the spinning head in order to draw and attenuate the filaments or fibres immediately at the outlet of the spinning head.

28. The process of claim 27, wherein said hot attenuating air is used also to break the filaments extruded through the spinning head into short fibres.

29. The process of claim 21, wherein the fibres produced by the spinning head comprises ultra-fine fibres having a diameter less than 2 μm.

30. The process of claim 21, wherein the fibres produced by the spinning head comprises fibres having a length between 4 mm and 30 mm.

31. The process of claim 27, wherein said hot attenuating air is used to draw the filaments extruded through the spinning head into continuous filaments, without breaking them.

32. The process of claim 27, wherein the filaments or fibres produced by the spinning unit are drawn only by said hot attenuating air.

33. The process of claim 21, wherein said at least one stream of cooling gas is at a temperature between 10° C. and 30° C.

34. The process of claim 21, wherein said at least one stream of cooling gas has a relative humidity between 60% and 80%.

35. The process of claim 21, wherein the speed of said at least one stream of cooling gas is not less than 5 m/s.

36. The process of claim 21, wherein the fibrous material comprises at least pulp fibres.

37. The process of claim 21, which further comprises forming a laminate by depositing the said fibrous-containing and/or particle-containing nonwoven onto an additional bottom layer.

38. The process of claim 21, which further comprises forming a laminate by depositing a top layer onto the fibrous-containing and/or particle-containing nonwoven.

39. The process of claim 21, which further comprises consolidating the fibrous-containing and/or particle-containing nonwoven or the laminate comprising the fibrous-containing and/or particle-containing nonwoven.

40. The process of claim 39, wherein the consolidating step of the fibrous-containing and/or particle-containing nonwoven or of the laminate is performed at least by thermal bonding.

41. The process of claim 21, wherein the nonwoven or laminate is compressed by the downstream transverse wall against the forming surface.

42. The process of claim 41, wherein the downstream transverse wall is compressing the nonwoven or laminate against the forming surface, and makes a seal that avoids any disturbing air from the ambient air to enter between the downstream transverse wall and the forming surface.

* * * * *